US012794795B2

(12) United States Patent
Maram et al.

(10) Patent No.: US 12,794,795 B2
(45) Date of Patent: Nov. 10, 2026

(54) DYNAMIC PERFORMANCE MONITORING SUPPORT FOR VDM

(71) Applicant: Juniper Networks, Inc., Sunnyvale, CA (US)

(72) Inventors: Raghavasandeep Maram, Bangalore (IN); Tapan Kumar Chauhan, Bangalore (IN); Shrishail Halbhavi, Bangalore (IN); Parag Dubey, Bangalore (IN); Vincent Collini, St. Catharines (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 309 days.

(21) Appl. No.: 18/819,038

(22) Filed: Aug. 29, 2024

(65) Prior Publication Data

US 2026/0025325 A1 Jan. 22, 2026

(30) Foreign Application Priority Data

Jul. 17, 2024 (IN) ............................ 202411054679

(51) Int. Cl.
*H04L 43/00* (2022.01)
*H04L 41/082* (2022.01)
*H04L 43/065* (2022.01)

(52) U.S. Cl.
CPC ............ *H04L 43/14* (2013.01); *H04L 41/082* (2013.01); *H04L 43/065* (2013.01)

(58) Field of Classification Search
CPC ...... H04L 43/14; H04L 41/082; H04L 43/065
See application file for complete search history.

(56) References Cited

U.S. PATENT DOCUMENTS

| | | | | |
|---|---|---|---|---|
| 10,732,961 | B1 * | 8/2020 | Madasamy | G06F 8/656 |
| 12,432,140 | B1 * | 9/2025 | Iwasaki | H04L 49/109 |
| 2021/0036913 | A1 * | 2/2021 | Gupta | H04L 41/082 |
| 2022/0291915 | A1 * | 9/2022 | Liu | G06F 8/65 |
| 2022/0413993 | A1 * | 12/2022 | Farinas | G06F 11/0754 |
| 2023/0006926 | A1 * | 1/2023 | Iwasaki | H04L 45/60 |
| 2025/0007751 | A1 * | 1/2025 | Handolescu | H04L 12/403 |
| 2026/0025325 | A1 * | 1/2026 | Maram | H04L 43/14 |

(Continued)

OTHER PUBLICATIONS

OIF, "Implementation Agreement for Coherent CMIS", IA OIF-C-CMIS-01.0, Jan. 14, 2020, 34 Pages.

(Continued)

*Primary Examiner* — Michael J Moore, Jr.
(74) *Attorney, Agent, or Firm* — ALG Intellectual Property, LLC

(57) ABSTRACT

A system for dynamically updating versatile diagnostic monitoring (VDM) features in performance monitoring (PM) software may include a port configured to house an optical module compatible with one or more versatile dynamic monitoring (VDM) features of performance monitoring (PM) software that monitors health of the optical module. In one example, the system may also include circuitry configured to (1) identify an update for PM software that monitors the health of the optical module, (2) install the update to add a VDM feature to the PM software, and (3) report data corresponding to the VDM feature via the PM software. Various other systems, methods, and computer-readable media are also disclosed.

20 Claims, 9 Drawing Sheets

(56) References Cited

U.S. PATENT DOCUMENTS

| | | | | |
|---|---|---|---|---|
| 2026/0067159 | A1* | 3/2026 | Kunduru | H04L 41/082 |
| 2026/0203177 | A1* | 7/2026 | Seifert, Jr. | G06F 11/221 |

OTHER PUBLICATIONS

OIF, "Implementation Agreement for Coherent CMIS", IA OIF-C-CMIS-01.1, Jun. 10, 2020 , 34 pages.

OIF, "Implementation Agreement for Coherent CMIS", IA OIF-C-CMIS-01.2 , Mar. 21, 2022 , 40 Pages.

OIF, "Implementation Agreement for Coherent CMIS", IA OIF-C-CMIS-01.3, Oct. 12, 2023, 43 Pages.

CMIS, "Common Management Interface Specification", Rev 5.0, May 8, 2021,300 Pages.

* cited by examiner

Update Template
300

```
-------------------------------------------------------------------------------
**********************************************

chassis {
    optics {
        vdm    <vdm-tag> {
                vdm    <vdm-id (defined in c-cmis/custom) >
               vdm-description  <val> < add | remove>
               [ data-type < u16 | s16 | float > ]
               [ lsb-scalling < 100 | 1 | .01 | 20 | .1> ]
              [ unit < % | ps/nm | ps | ps^2 | MHZ | dB | dBm >]
              default-min-tca <val>
              default-max-tca <val>
              [ vendor-pn   <string>]

        }
  }
}

Interface <> {
     optics-options {
        vdm-list    <vdm-tag>
        vdm-off
        vdm-on
     }
}

**********************************************
-------------------------------------------------------------------------------
```

*FIG. 3*

Update
400

```
------------------------------------------------------------------------------------------
*********************************************************

 set chassis optics vdm q-factor
      vdm    151              /* 151 is from VDM table */
      vdm-description  "Q-factor" /* User Description */
      add                     /* Tells whether it has to be considered or not in the PM */
      data-type   u16  /* All below are referred from VDM table present in C-CMIS XX */
      lsb-scaling  .1
      unit  dB
      default-min-tca   30
      default-max-tca  100

 set interface et-0/0/0 optics-option vdm-list q-factor

*********************************************************
------------------------------------------------------------------------------------------
```

FIG. 4

VDM features
500

------------------------------------------------------------------------
*********************************************

| Identifier | Description | Data Type | LSB Scaling | Unit |
|---|---|---|---|---|
| 128 | Modulator Bias X/I | U16 | 100/65,535 | % |
| 129 | Modulator Bias X/Q | U16 | 100/65,535 | % |
| 130 | Modulator Bias Y/I | U16 | 100/65,535 | % |
| 131 | Modulator Bias Y/Q | U16 | 100/65,535 | % |
| 132 | Modulator Bias X_Phase | U16 | 100/65,535 | % |
| 133 | Modulator Bias Y_Phase | U16 | 100/65,535 | % |
| 134 | CD – high granularity, short link: Note2 | S16 | 1 | Ps/nm |
| 135 | CD – low granularity, long link: Note2 | S16 | 20 | Ps/nm |
| 136 | DGD | U16 | 0.01 | Ps |
| 137 | SOPMD – high granularity | U16 | 0.01 | Ps^2 |
| 138 | PDL | U16 | 0.1 | dB |
| 139 | OSNR | U16 | 0.1 | dB |
| 140 | eSNR | U16 | 0.1 | dB |
| 141 | CFO | S16 | 1 | MHz |
| 142 | EVM Note 3: | U16 | 100/65,535 | % |
| 143 | Tx Power | S16 | 0.01 | dBm |
| 144 | Rx Total Power | S16 | 0.01 | dBm |
| 145 | Rx Signal Power | S16 | 0.01 | dBm |
| 146 | SOP ROC | U16 | 1 | krad/s |
| 147 | MER | U16 | 0.1 | dB |
| 148 | Clock recovery loop: Note1 | S16 | 100/32,767 | % |
| 149 | SOPMD – low granularity | U16 | 1 | Ps^2 |
| 150 | SNR_margin | S16 | 0.1 | dB |
| 151 | Q-factor | U16 | 0.1 | dB |
| 152 | Q-margin | S16 | 0.1 | dB |

*********************************************
------------------------------------------------------------------------

FIG. 5

DYNAMIC PERFORMANCE MONITORING SUPPORT FOR VDM

BACKGROUND

Certain network devices, such as routers and/or switches, may include and/or house pluggable optical modules that facilitate communication within and/or across networks. Such network devices may run performance monitoring (PM) software that monitors the health of the pluggable optical modules via versatile diagnostic monitoring (VDM) features. Occasionally, the PM software may be upgraded to support new VDM releases. Unfortunately, the PM software may be unable to accommodate and/or implement new VDM releases without reinstalling the full PM software (e.g., the image of the PM software) to the upgraded version. Additionally or alternatively, the PM software may be unable to facilitate and/or support removal and/or exclusion of unwanted VDM features. The instant disclosure, therefore, identifies and addresses a need for systems and methods capable of dynamically updating VDM features in PM software.

SUMMARY

As will be described in greater detail below, the instant disclosure generally relates to systems and methods for dynamically updating versatile diagnostic monitoring features in performance monitoring software. In one example, a system for dynamically updating versatile diagnostic monitoring features in performance monitoring software may include a port configured to house an optical module compatible with one or more versatile dynamic monitoring (VDM) features of performance monitoring (PM) software that monitors health of the optical module. In this example, the system may also include circuitry configured to (1) identify a configuration update for the PM software, (2) activate a VDM feature of the PM software based at least in part the configuration update, and (3) report data corresponding to the VDM feature via the PM software.

A corresponding method may include (1) identifying, by circuitry, a configuration update for performance monitoring (PM) software that monitors health of an optical module compatible with one or more versatile dynamic monitoring (VDM) features of the PM software, (2) activating, by the circuitry, a VDM feature of the PM software based at least in part on the configuration update, and then (3) reporting, by the circuitry, data corresponding to the VDM feature via the PM software.

A corresponding non-transitory computer-readable medium may include one or more computer-executable instructions. In one example, when executed by a processing device, such computer-executable instructions may cause the processing device to (1) identify a configuration update for performance monitoring (PM) software that monitors health of an optical module compatible with one or more versatile dynamic monitoring (VDM) features of the PM software, (2) activate a VDM feature of the PM software based at least in part on the configuration update, and (3) report data corresponding to the VDM feature via the PM software.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 3 is an illustration of an exemplary update template for dynamically updating VDM features in PM software according to one or more embodiments of this disclosure.

FIG. 4 is an illustration of an exemplary update that causes a network device to dynamically update PM software according to one or more embodiments of this disclosure.

FIG. 5 is an illustration of an exemplary listing of VDM features supported by in PM software according to one or more embodiments of this disclosure.

Figure 1:
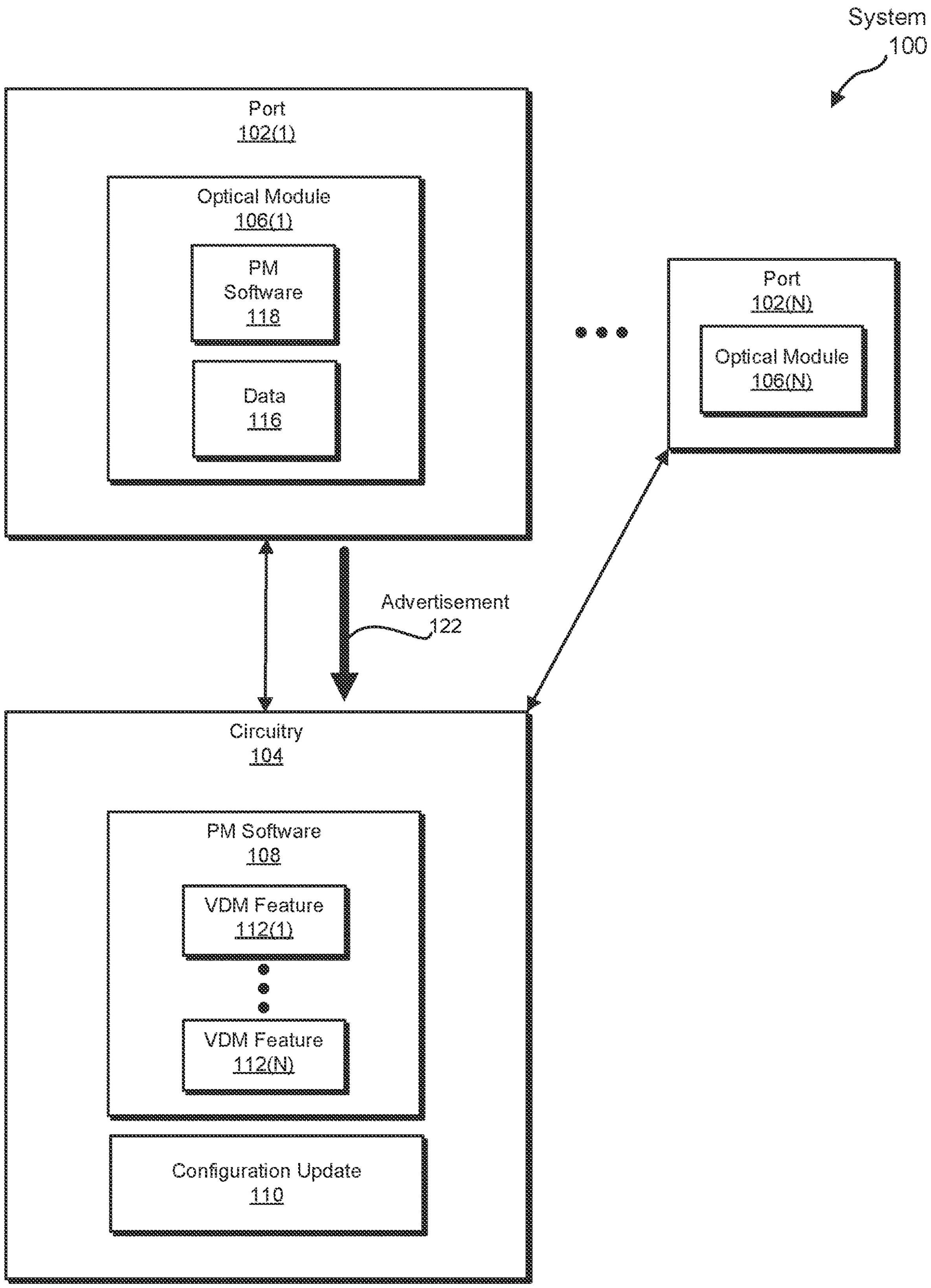
FIG. 1 is an illustration of an exemplary system for dynamically updating VDM features in PM software according to one or more embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for dynamically updating VDM features in PM software. As will be explained in greater detail below, embodiments of the present disclosure may facilitate, support, and/or involve modifying in PM software installed on a network device (e.g., a router, switch, optical network device, etc.). Embodiments of the present disclosure may involve adding, deleting, disabling, enabling, activating, and/or deactivating VDM features in the PM software without reinstalling the PM software (e.g., the image of the PM software) to an upgraded version and/or a rolled-back version on the network device. By doing so, such embodiments may facilitate, support, and/or involve reducing the compute load of the PM software on the network device and/or reducing the transmission load on a bus (e.g., a serial communication bus) that communicatively couples a monitored optical module to a processor that hosts the PM software on the network device.

The following will provide, with reference to FIGS. 1-7, detailed descriptions of an exemplary devices, systems, and corresponding implementations and configurations that facilitate and/or support dynamically updating VDM features in PM software. The following will also provide, with reference to FIG. 8, examples of methods for dynamically updating VDM features in PM software. In addition, detailed descriptions of an exemplary computing system for carrying out these methods will be provided in connection with FIG. 9.

FIG. 1 illustrates an exemplary system 100 for dynamically updating VDM features in PM software. As illustrated in FIG. 1, system 100 may include and/or represent ports 102(1)-(N) configured and/or dimensioned to house and/or accept optical modules 106(1)-(N), respectively. In some examples, system 100 may also include and/or represent circuitry 104 that executes and/or implements at least a portion of PM software 108 and/or PM software 118 that monitor, track, and/or evaluate the heath of optical modules 106(1)-(N). In one example, circuitry 104 may be communicatively coupled to one or more of ports 102(1)-(N) and/or optical modules 106(1)-(N).

In some examples, optical modules 106(1)-(N) may also execute and/or implement at least a portion of PM software 108 and/or PM software 118. For example, circuitry 104 may execute and/or implement a host component of PM software 108, and/or optical modules 106(1)-(N) may each execute and/or implement a client component of PM software 118. In this example, the client components of PM software 118 may report certain data and/or statistics to the host component of PM software 108. In one example, PM software 108 and/or PM software 118 may include and/or represent support for one or more of VDM features 112(1)-(N) upon and/or at the time of installation in system 100.

In some examples, circuitry 104 may receive, retrieve, identify, and/or generate an update 110 for PM software 108 and/or PM software 118. In one example, circuitry 104 may be implemented by and/or incorporated in a computing device operated by an administrator who provides user input that constitutes and/or forms at least a portion of update 110. Additionally or alternatively, circuitry 104 may receive and/or obtain update 110 as a software package and/or module from a remote device (e.g., computing device 204 in FIG. 2).

In some examples, PM software 108 and/or PM software 118 may include and/or represent a version and/or release that, upon and/or at the time of installation in system 100, lacked and/or excluded support for one or more of VDM features 112(1)-(N). For example, at the time of installation in system 100, PM software 108 and/or PM software 118 may include and/or represent support for VDM feature 112(1). However, in this example, at the time of installation in system 100, PM software 108 and/or PM software 118 may lack and/or exclude support for VDM feature 112(N). Accordingly, upon applying update 110 in system 100, PM software 108 may be able to fetch VDM 112(N) without being fully upgraded to a new version. Additionally or alternatively, optical modules 106(1)-(N) may include, constitute, and/or represent an optics hardware revision and/or an optics firmware revision that does not necessarily support VDM 112(N).

In some examples, circuitry 104 may install and/or apply configuration update 110 to add, delete, activate, deactivate, disable, and/or enable one or more of VDM features 112 (1)-(N) in PM software 108 without reinstalling PM software 108 (e.g., the image of the PM software) to an upgraded version and/or a rolled-back version on the network device. In one example, circuitry 104 may achieve and/or gain support for one or more of VDM features 112(1)-(N) via configuration update 110 instead of installing a different and/or newer version of PM software 108 that supports such VDM features. In this example, configuration update 110 may constitute and/or represent the addition, deletion, activation, deactivation, disablement, and/or enablement of one or more of VDM features 112(1)-(N). Configuration update 110 may include and/or represent significantly less data and/or files than an upgrade of PM software 108. However, an upgrade of PM software 108 may include and/or represent a substantially complete reinstall of a different and/or newer version, release, and/or image of PM software 108.

In some examples, configuration update 110 may cause and/or enable circuitry 104 to modify PM software 108 to interpret data corresponding to a newly added VDM feature. For example, circuitry 104 may receive and/or obtain at least one advertisement 122 from optical module 106(1). In this example, circuitry 104 may identify data 116 corresponding to the newly added VDM feature in advertisement 122. Circuitry 104 may also facilitate and/or support evaluating and/or analyzing the health of optical module 106(1).

In some examples, circuitry 104 may interpret, decode, and/or recognize data 116 as presented in advertisement 122 based at least in part on a data format provided in configuration update 110. In one example, configuration update 110 may cause and/or enable circuitry 104 to accurately read and/or interpret data 116 arrives in advertisement 122 due to the data format. In certain implementations, the data format may include, identify, and/or represent an identifier of the VDM feature, a data type of the VDM feature, a least significant bit (LSB) scale of the VDM feature, and/or a unit of measurement of the VDM feature.

In some examples, circuitry 104 may modify, reconfigure, and/or reprogram one or more of optical modules 106(1)-(N) and/or the client component of PM software 108 running on optical modules 106(1)-(N). For example, such a modification, reconfiguration, and/or reprogramming may cause optical modules 106(1)-(N) to avoid processing, including, and/or inserting data corresponding to deleted and/or disabled VDM features for advertisement 122. In other words, such a modification, reconfiguration, and/or reprogramming may cause optical modules 106(1)-(N) to refrain from reporting data corresponding to deleted and/or disabled VDM features via advertisement 122.

Additionally or alternatively, such a modification, reconfiguration, and/or reprogramming may cause optical modules 106(1)-(N) to process, include, and/or insert data corresponding to added and/or enabled VDM features for advertisement 122. As a result, configuration update 110 may cause and/or enable system 100 to reduce the compute load of PM software 108 in circuitry 104 and/or reduce the transmission load on a bus, such as a serial communication bus like inter-integrated circuit ($I^2C$) and/or serial peripheral interface (SPI), that communicatively couples one or more of optical modules 106(1)-(N) to circuitry 104.

In some examples, VDM features 112(1)-(N) may each include and/or represent any type or form of attributes, metrics, characteristics, and/or features of an optical module. In one example, VDM features 112(1)-(N) may indicate and/or represent certain aspects of the health of an optical module operating and/or running in system 100. Examples of VDM features 112(1)-(N) include, without limitation, an electrical signal-to-noise ratio (ESNR), an optical signal-to-noise ratio (OSNR), a chromatic dispersion value, a differential group delay, a polarization dependent loss (PDL) value, a carrier frequency offset, a power level of a receiver signal, a power level of a transmitter signal, the total power consumed by an optical module, a modulator bias value, a signal-to-noise (SNR) margin, a Q factor, a Q-factor margin, combinations or variations of one or more of the same, and/or any other suitable VDM features.

As a specific example, PM software 108 and/or PM software 118 may be programmed and/or configured to cause optical modules 106(1)-(N) to report various VDM features 112(1)-(N) to circuitry 104. For example, PM software 118 may cause and/or direct optical modules 106(1)-(N) to report data and/or statistics about their corresponding ESNRs, OSNRs, PDL values, modulator bias values, etc. However, PM software 118 may initially lack support for reporting data and/or statistics about the SNR margins, Q factors, and/or Q-factor margins of optical modules 106(1)-(N). In this example, upon installation and/or implementation by circuitry 104, configuration update 110 may effectively reprogram and/or reconfigure PM software 118 such that optical modules 106(1)-(N) no longer report data and/or statistics about their PDL values and/or modulator bias values. Additionally or alternatively, upon installation and/or implementation by circuitry 104, configuration update 110 may effectively reprogram and/or reconfigure PM software 118 such that optical modules 106(1)-(N) begin reporting data and/or statistics about their corresponding SNR margins, Q factors, and/or Q-factor margins.

As another example, PM software 108 may cause and/or direct circuitry 104 to fetch data and/or statistics about the ESNRs, OSNRs, PDL values, modulator bias values, etc, from optical modules 106(1)-(N). However, PM software 108 may initially lack support for fetching data and/or statistics about the SNR margins, Q factors, and/or Q-factor margins from optical modules 106(1)-(N). In this example, upon installation and/or implementation by circuitry 104, configuration update 110 may effectively reprogram and/or reconfigure PM software 108 such that circuitry 104 no longer fetches data and/or statistics about their PDL values and/or modulator bias values from optical modules 106(1)-(N). Additionally or alternatively, upon installation and/or implementation by circuitry 104, configuration update 110 may effectively reprogram and/or reconfigure PM software 108 such that circuitry 104 begin fetching data and/or statistics about the SNR margins, Q factors, and/or Q-factor margins from optical modules 106(1)-(N).

In some examples, circuitry 104 may include and/or represent one or more electrical and/or electronic circuits capable of processing, applying, modifying, transforming, displaying, transmitting, receiving, and/or executing data for system 100. Additionally or alternatively, circuitry 104 may launch, perform, and/or execute certain executable files, code snippets, and/or computer-readable instructions to facilitate and/or support dynamically updating VDM features in PM software. In one example, circuitry 104 may be implemented by and/or incorporated in a network device (e.g., a router and/or switch) and/or one or more optical modules.

Although illustrated as a single unit in FIG. 1, circuitry 104 may include and/or represent a collection of multiple processing units and/or electrical or electronic components that work and/or operate in conjunction with one another. Examples of circuitry 104 include, without limitation, application-specific integrated circuits (ASICs), central processing units (CPUs), processing devices, microprocessors, microcontrollers, graphics processing units (GPUs), field-programmable gate arrays (FPGAs), systems-on-chips (SoCs), parallel accelerated processors, tensor cores, integrated circuits, chiplets, optical modules, receivers, transmitters, transceivers, optical modules, portions of one or more of the same, variations or combinations of one or more of the same, and/or any other suitable circuitry.

In some examples, ports 102(1)-(N) may include and/or represent housings, cages, structures, and/or connection mechanisms that houses optical modules 106(1)-(N), respectively. In one example, ports 102(1)-(N) may each include and/or represent an electromechanical connection and/or communication interface. In this example, ports 102(1)-(N) may be designed to physically support, accept, and/or receive optical modules 106(1)-(N), respectively. Additionally or alternatively, ports 102(1)-(N) may serve as a form of electromagnetic shielding for the optical transceiver module.

In some examples, ports 102(1)-(N) may be configured to lock optical modules 106(1)-(N), respectively, into place within system 100. In other words, ports 102(1)-(N) may physically maintain and/or hold optical modules 106(1)-(N) within system 100. In addition to its mechanical structure and purpose, ports 102(1)-(N) may also serve as an electrical and/or optical interface for optical modules 106(1)-(N). For example, ports 102(1)-(N) may effectively connect optical modules 106(1)-(N) to system 100 optically and/or electrically.

Optical modules 106(1)-(N) may be of various shapes and/or dimensions. In some examples, optical modules 106(1)-(N) may each be formed in a Small Form-Factor (SFP) pluggable package and/or Quad SFP (QSFP) pluggable package. For example, optical modules 106(1)-(N) may each include and/or represent a Type 1, Type 2, and/or Type 3 QSFP module. In other examples, optical modules 106(1)-(N) may each include and/or represent a QSFP Double Density (QSFP-DD) module and/or an Octal Small Form-Factor Pluggable Riding Heat Sink (OSFP-RHS). In one example, optical modules 106(1)-(N) may each support synchronous optical networking (SONET), Ethernet, fibre channel, and/or other communications standards and/or protocols. Additionally or alternatively, optical modules 106(1)-(N) may each plug into SFP and/or QSFP sockets, ports, and/or cages. Optical modules 106(1)-(N) may each be electrically and/or communicatively coupled to one or more computing devices via a fiber optic cable, copper wiring, and/or another type of network cable. In this way, optical modules 106(1)-(N) may each enable system 100 communicate with such devices within the same network and/or across multiple networks.

In some examples, system 100 may include and/or represent any type or form of physical computing device and/or network of computing devices capable of reading computer-executable instructions and/or handling network traffic via optical modules 106(1)-(N). Examples of system 100 include, without limitation, network devices, routers (such as provider edge routers, hub routers, spoke routers, autonomous system boundary routers, and/or area border routers), rackmount telecommunications devices, switches, hubs, modems, bridges, repeaters, gateways (such as broadband network gateways), multiplexers, network adapters, network interfaces, client devices, laptops, tablets, desktops, servers, variations or combinations of one or more of the same, and/or any other suitable systems.

Figure 2:
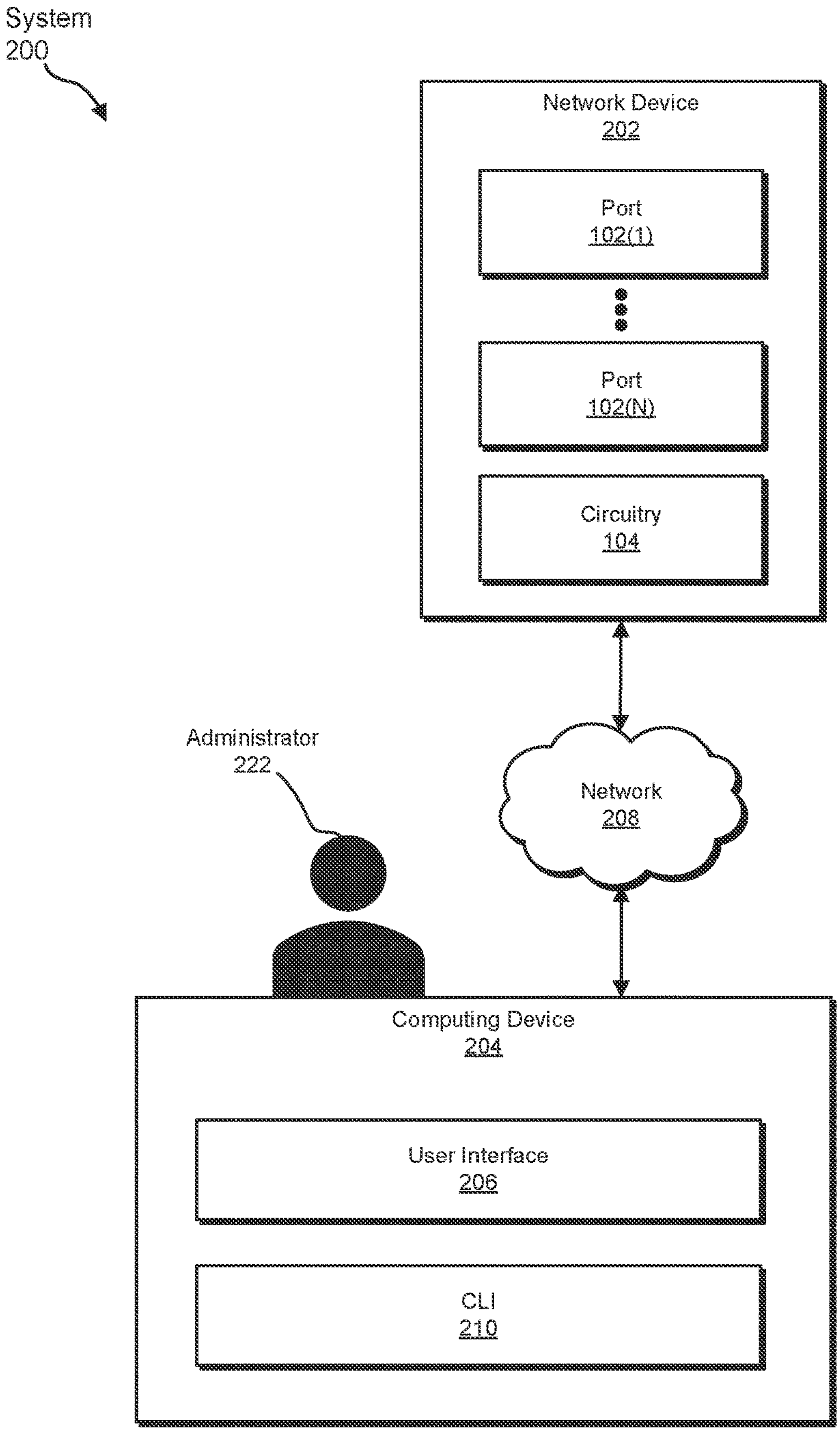
FIG. 2 is an illustration of an exemplary system for dynamically updating VDM features in PM software according to one or more embodiments of this disclosure.

Exemplary system 100 in FIG. 1 may be implemented in a variety of ways. For example, all or a portion of exemplary system 100 may include and/or represent portions of an exemplary system 200 in FIG. 2. As illustrated in FIG. 2, exemplary system 200 may include and/or represent a network device 202, such as a router and/or switch, and a computing device 204 communicatively coupled to one another via a network 208. In some examples, system 200 may include and/or represent certain mechanisms, components, and/or features that perform and/or provide functionalities that are similar and/or identical to those described above in connection with FIG. 1. Although illustrated as being external to network 208 in FIG. 2, network device 202 and/or computing device 204 may alternatively represent portions of network 208 and/or be included in network 208.

In some examples, network device 202 may include and/or represent ports 102(1)-(N) and/or circuitry 104. In one example, computing device 204 may include and/or represent a user interface 206 and/or a command-line interface (CLI) 208. In this example, computing device 204 may be operated and/or controlled by an administrator 222.

In some examples, circuitry 104 may receive configuration update 110 from computing device 204 operated by administrator 222. In one example, administrator 222 may provide user input to computing device 204 via a user interface 206. In this example, the user input may constitute and/or form at least a portion of configuration update 110. Additionally or alternatively, circuitry 104 may receive configuration update 110 as an event, package, or module from a remote device (e.g., computing device 204 or another device not necessarily illustrated in FIG. 2).

In some examples, circuitry 104 may enable PM software 108 to communicate with CLI 210 of computing device 204. In one example, PM software 108 may cause and/or direct circuitry 104 and/or network device 202 to report data corresponding to one or more of VDM features 112(1)-(N) to administrator 222 via CLI 210. In this example, one or more of those VDM features may be added to and/or enabled in PM software 108 as part of configuration update 110.

FIG. 3 illustrates an exemplary update template 300 for dynamically updating VDM features in PM software. In some examples, PM software 108 may be programmed and/or configured to read, interpret, install, apply, and/or implement updates formatted in accordance with update template 300. FIG. 4 illustrates an exemplary configuration update 400 that causes network device 202 and/or circuitry 104 to dynamically update one or more VDM features in PM software. For example, PM software 108 running on network device 202 and/or circuitry 104 may install and/or apply configuration update 400. In this example, upon completion of configuration update 400, PM software 108 may cause computing device 204 to fetch "Q-factor" data and/or statistics from one or more of optical modules 106(1)-(N) for viewing and/or analysis by administrator 222. Additionally or alternatively, upon completion of configuration update 400, PM software 118 may cause one or more of optical modules 106(1)-(N) to report "Q-factor" data and/or statistics to computing device 204 for viewing and/or analysis by administrator 222.

In some examples, configuration update 400 may cause PM software 108 and/or PM software 118 to recognize and/or report a new "Q-factor" VDM feature. In one example, the new "Q-factor" VDM feature may be assigned an identifier "151" and/or a "Q-factor" description via configuration update 400. In this example, the new "Q-factor" VDM feature may be formatted with a "u16" data type, "0.1" LSB scale, and/or a "dB" unit of measurement. In certain implementations, configuration update 400 may include and/or represent code, scripts, and/or settings that, upon installation, modify PM software 108 in one way or another.

FIG. 5 illustrates an exemplary listing of VDM features 500 monitored and/or reported by PM software on network device 202. In some examples, the listing of VDM features 500 may identify and/or specify information about a PM software's ESNR, OSNR, chromatic dispersion value, differential group delay, PDL value, carrier frequency offset, power level of a receiver signal, power level of a transmitter signal, the total power consumed by an optical module, modulator bias value, SNR margin, Q factor, and/or Q-factor margin. In this example, VDM features 500 may be formatted, identified, and/or differentiated by identifiers, descriptions, data types, LSB scales, and/or units of measurement.

Figure 6:
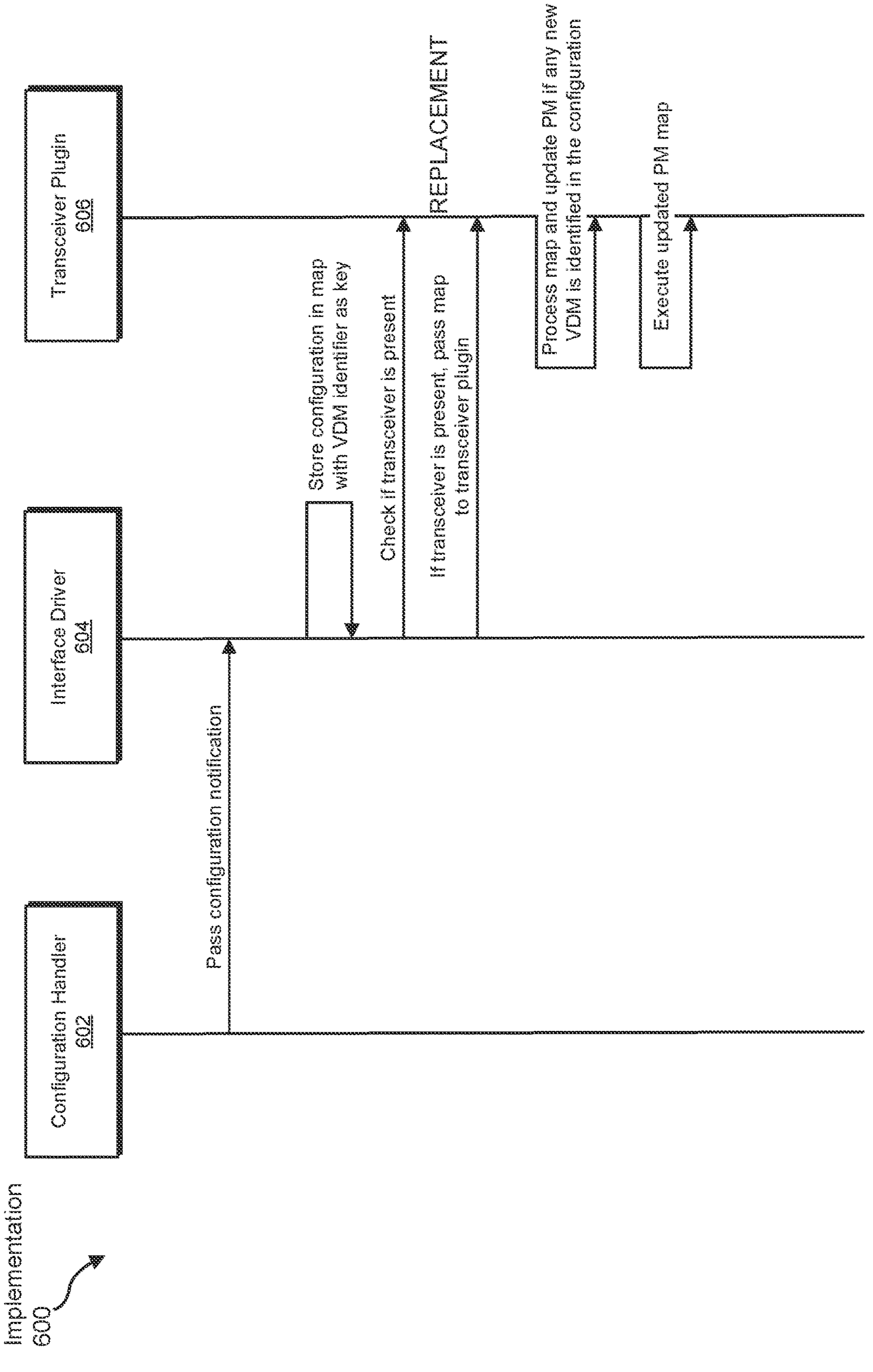
FIG. 6 is an illustration of an exemplary implementation of updating PM software according to one or more embodiments of this disclosure.

FIG. 6 illustrate an exemplary implementation 600 of updating PM software 108. In some examples, circuitry 104 may implement a configuration handler 602, an interface driver 604, and/or a transceiver plugin 606 in connection with PM software 108 and/or configuration update 110. In one example, as part of implementing and/or installing configuration update 110, configuration handler 602 may pass a configuration notification to an interface driver 604. In this example, interface driver 604 may then store the configuration provided with the notification in a map of PM software 108.

In some examples, interface driver 604 may check if a transceiver, such as optical module 106(1), is present in the corresponding port. In one example, if the transceiver is present, interface driver 604 may then pass the map of PM software 108 to transceiver plugin 606. In this example, upon receiving the map, transceiver plugin 606 may process the map and/or update PM software 108 if any new VDM features are identified in the configuration. Transceiver plugin 606 may then execute update the map as part of PM software 108.

Figure 7:
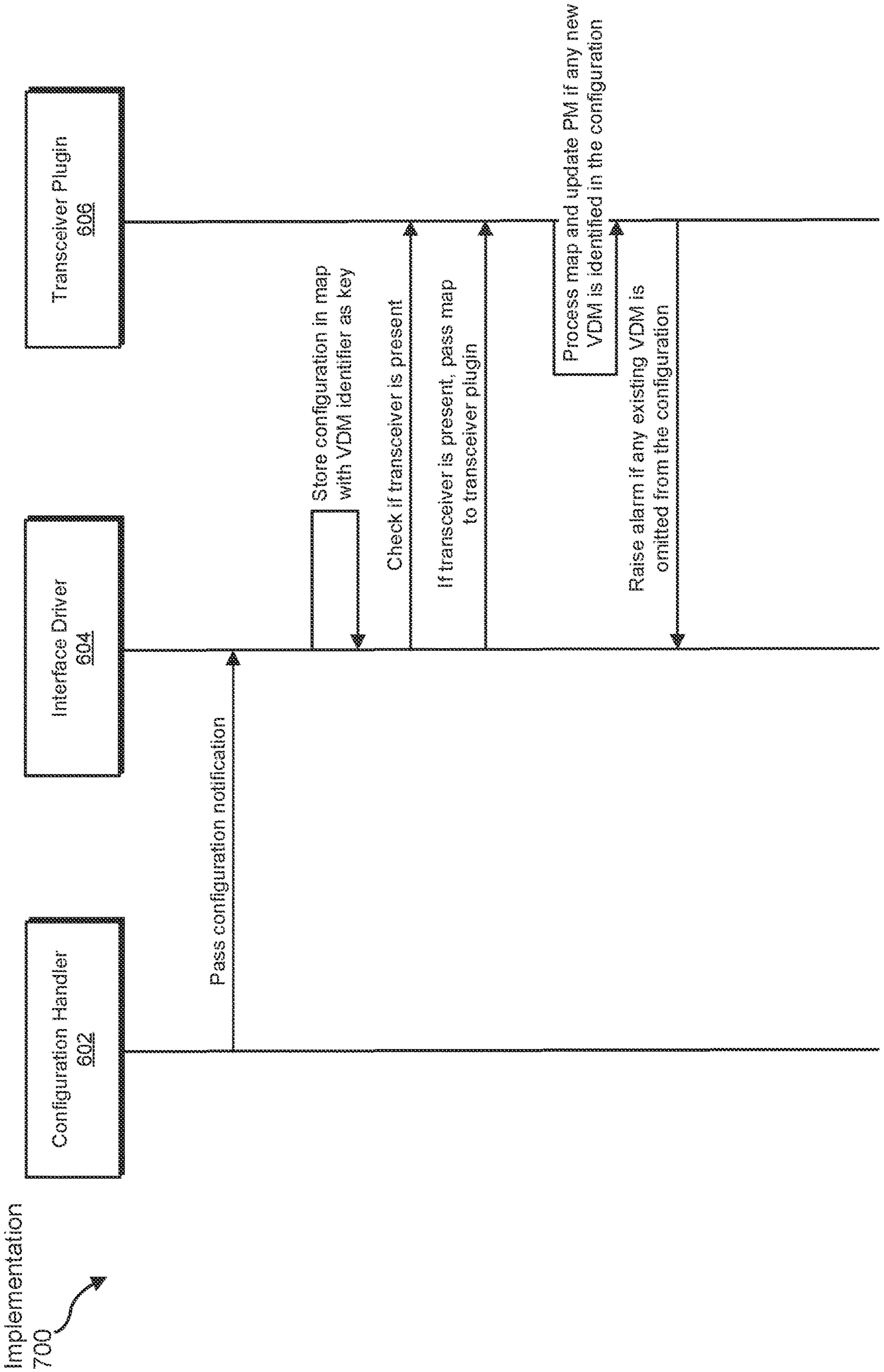
FIG. 7 is an illustration of an exemplary implementation of updating PM software according to one or more embodiments of this disclosure.

FIG. 7 illustrate an exemplary implementation 700 of updating PM software 108. In some examples, implementation 700 may include and/or represent certain features that are similar and/or identical to those described above in connection with FIG. 6. In one example, upon receiving the map as part of configuration update 110, transceiver plugin 606 may process the map and/or update PM software 108 if any new VDM features are identified in the configuration. In this example, transceiver plugin 606 may then raise an alarm (e.g., to notify administrator 222) if any previously existing VDM features is omitted from the configuration.

In some examples, the various components, devices, and systems described in connection with FIGS. 1-7 may include and/or represent one or more additional circuits, components, and/or features that are not necessarily illustrated and/or labeled in FIGS. 1-7. For example, the components, devices, and systems illustrated in FIGS. 1-7 may also include and/or represent additional analog and/or digital circuitry, onboard logic, transistors, RF transmitters, RF receivers, transceivers, antennas, resistors, capacitors, diodes, inductors, switches, registers, flipflops, digital logic, connections, traces, buses, semiconductor (e.g., silicon) devices and/or structures, processing devices, storage devices, circuit boards, sensors, packages, substrates, housings, combinations or variations of one or more of the same, and/or any other suitable components. In certain implementations, one or more of these additional circuits, components, and/or features may be inserted and/or applied between any of the existing circuits, components, and/or features illustrated in FIGS. 1-7 consistent with the aims and/or objectives described herein. Accordingly, the couplings and/or connections described with reference to FIGS. 1-7 may be direct connections with no intermediate components, devices, and/or nodes or indirect connections with one or more intermediate components, devices, and/or nodes.

In some examples, the phrase "to couple" and/or the term "coupling", as used herein, may refer to a direct connection and/or an indirect connection. For example, a direct coupling between two components may constitute and/or represent a coupling in which those two components are directly connected to each other by a single node that provides continuity from one of those two components to the other. In other words, the direct coupling may exclude and/or omit any additional components between those two components.

Additionally or alternatively, an indirect coupling between two components may constitute and/or represent a coupling in which those two components are indirectly connected to each other by multiple nodes that fail to provide continuity from one of those two components to the other. In other words, the indirect coupling may include and/or incorporate at least one additional component between those two components.

Figure 8:
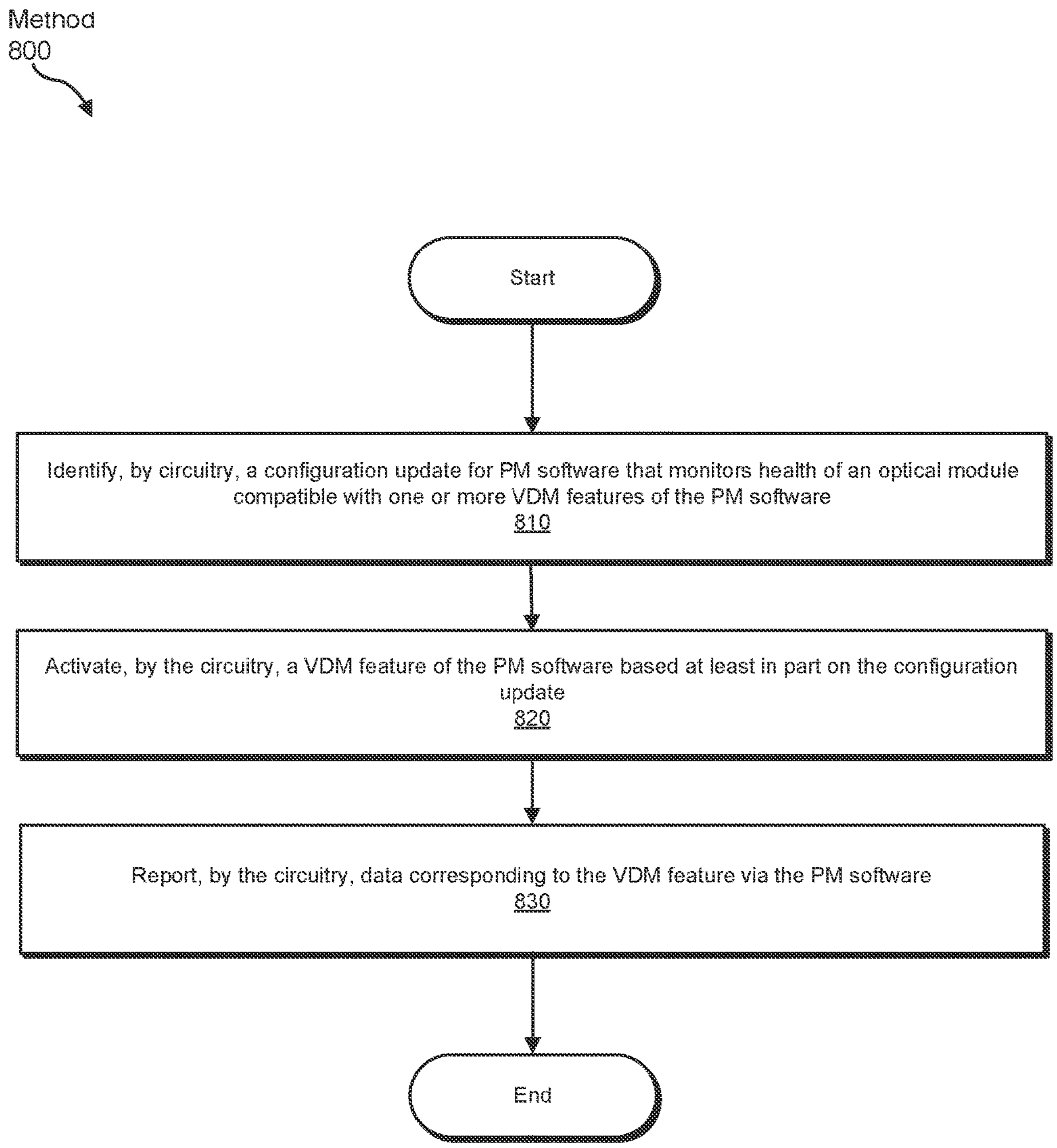
FIG. 8 is a flow diagram of an exemplary method for dynamically updating VDM features in PM software according to one or more embodiments of this disclosure.

FIG. 8 is a flow diagram of an exemplary method 800 for dynamically updating VDM features in PM software. Method 800 may include the step of identifying, by circuitry, a configuration update for performance monitoring (PM) software that monitors health of an optical module compatible with one or more versatile dynamic monitoring (VDM) features of the PM software (810). Step 810 may be performed in a variety of ways, including any of those described above in connection with FIGS. 1-7. For example, circuitry may identify a configuration update for PM software that monitors health of an optical module compatible with one or more VDM features of the PM software.

Method 800 may also include the step of activating, by the circuitry, a VDM feature of the PM software based at least in part on the configuration update (820). Step 820 may be performed in a variety of ways, including any of those described above in connection with FIGS. 1-7. For example, the circuitry may activate a VDM feature of the PM software based at least in part on the configuration update.

Method 800 may further include the step of reporting, by the circuitry, data corresponding to the VDM feature via the PM software (830). Step 830 may be performed in a variety of ways, including any of those described above in connection with FIGS. 1-7. For example, the circuitry may report data corresponding to the VDM feature via the PM software.

Figure 9:
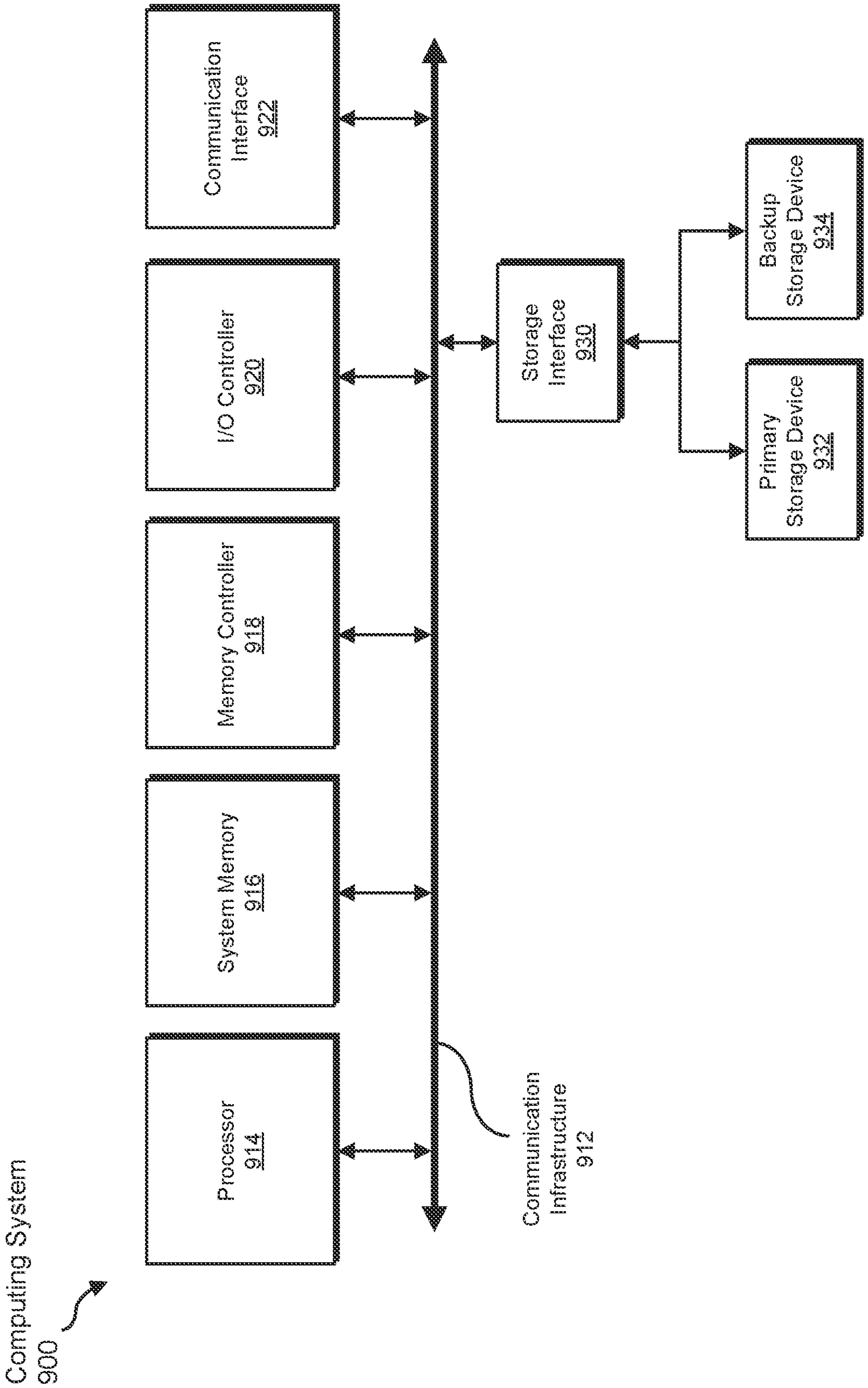
FIG. 9 is a block diagram of an exemplary computing system capable of implementing and/or being used in connection with one or more of the embodiments described and/or illustrated herein.

FIG. 9 is a block diagram of an exemplary computing system 900 capable of implementing and/or being used in connection with one or more of the embodiments described and/or illustrated herein. In some embodiments, all or a portion of computing system 900 may perform and/or be a means for performing, either alone or in combination with other elements, one or more of the steps described in connection with any of FIGS. 1-8. All or a portion of computing system 900 may also perform and/or be a means for performing and/or implementing any other steps, methods, or processes described and/or illustrated herein.

Computing system 900 broadly represents any type or form of electrical load, including a single or multi-processor computing device or system capable of executing computer-readable instructions. Examples of computing system 900 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 900 may be programmed, configured, and/or otherwise designed to comply with one or more networking protocols. According to certain embodiments, computing system 900 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 900 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPOE), a Point-to-Point Protocol over ATM (PPPOA), a Bluetooth protocol, an IEEE 802.XX protocol, a frame relay protocol, a token ring protocol, a spanning tree protocol, and/or any other suitable protocol.

Computing system 900 may include various network and/or computing components. For example, computing system 900 may include at least one processor 914 and a system memory 916. Processor 914 generally represents any type or form of processing unit capable of processing data or interpreting and executing instructions. For example, processor 914 may represent an application-specific integrated circuit (ASIC), a system on a chip (e.g., a network processor), a hardware accelerator, a general purpose processor, and/or any other suitable processing element.

Processor 914 may process data according to one or more of the networking protocols discussed above. For example, processor 914 may execute or implement a portion of a protocol stack, may process packets, may perform memory operations (e.g., queuing packets for later processing), may execute end-user applications, and/or may perform any other processing tasks.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 900 may include both a volatile memory unit (such as, for example, system memory 916) and a non-volatile storage device (such as, for example, primary storage device 932, as described in detail below). System memory 916 may be implemented as shared memory and/or distributed memory in a network device. Furthermore, system memory 916 may store packets and/or other information used in networking operations.

In certain embodiments, exemplary computing system 900 may also include one or more components or elements in addition to processor 914 and system memory 916. For example, as illustrated in FIG. 9, computing system 900 may include a memory controller 918, an Input/Output (I/O) controller 920, and a communication interface 922, each of which may be interconnected via communication infrastructure 912. Communication infrastructure 912 generally represents any type or form of infrastructure capable of facilitating communication between one or more components of a computing device. Examples of communication infrastructure 912 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 918 generally represents any type or form of device capable of handling memory or data or controlling communication between one or more components of computing system 900. For example, in certain embodiments memory controller 918 may control communication between processor 914, system memory 916, and I/O controller 920 via communication infrastructure 912. In some embodiments, memory controller 918 may include a Direct Memory Access (DMA) unit that may transfer data (e.g., packets) to or from a link adapter.

I/O controller 920 generally represents any type or form of device or module capable of coordinating and/or controlling the input and output functions of a computing device. For example, in certain embodiments I/O controller 920 may control or facilitate transfer of data between one or more elements of computing system 900, such as processor 914, system memory 916, communication interface 922, and storage interface 930.

Communication interface 922 broadly represents any type or form of communication device or adapter capable of facilitating communication between exemplary computing system 900 and one or more additional devices. For example, in certain embodiments communication interface 922 may facilitate communication between computing system 900 and a private or public network including additional computing systems. Examples of communication interface 922 include, without limitation, a link adapter, a wired network interface (such as a network interface card), a wireless network interface (such as a wireless network interface card), and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 922 may also represent a host adapter configured to facilitate communication between computing system 900 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also enable computing system 900 to engage in distributed or remote computing. For example, communication interface 922 may receive instructions from a remote device or send instructions to a remote device for execution.

As illustrated in FIG. 9, exemplary computing system 900 may also include a primary storage device 932 and/or a backup storage device 934 coupled to communication infrastructure 912 via a storage interface 930. Storage devices 932 and 934 generally represent any type or form of storage device or medium capable of storing data and/or other computer-readable instructions. For example, storage devices 932 and 934 may represent a magnetic disk drive (e.g., a so-called hard drive), a solid state drive, a floppy disk drive, a magnetic tape drive, an optical disk drive, a flash drive, or the like. Storage interface 930 generally represents any type or form of interface or device for transferring data between storage devices 932 and 934 and other components of computing system 900.

In certain embodiments, storage devices 932 and 934 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 934 may also include other similar structures or devices for allowing computer software, data, or other computer-readable instructions to be loaded into computing system 900. For example, storage devices 932 and 934 may be configured to read and write software, data, or other computer-readable information. Storage devices 932 and 934 may be a part of computing system 900 or may be separate devices accessed through other interface systems.

Many other devices or subsystems may be connected to computing system 900. Conversely, all of the components and devices illustrated in FIG. 9 need not be present to practice the embodiments described and/or illustrated herein. The devices and subsystems referenced above may also be interconnected in different ways from those shown in FIG. 9. Computing system 900 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, the circuitry described herein may transform data, physical devices, and/or representations of physical devices from one form to another. Additionally or alternatively, the circuitry described herein may transform a processor, volatile memory, non-volatile memory, and/or any other portion of a physical computing device from one form to another by executing on the computing device, storing data on the computing device, and/or otherwise interacting with the computing device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
- a port configured to house an optical module compatible with one or more versatile dynamic monitoring (VDM) features of performance monitoring (PM) software that monitors health of the optical module; and
- circuitry configured to:
  - identify a configuration update for the PM software;
  - activate a VDM feature of the PM software based at least in part on the configuration update; and
  - report data corresponding to the VDM feature via the PM software.

2. The system of claim 1, wherein the circuitry is further configured to:
- receive at least one advertisement from the optical module;
- identify the data corresponding to the VDM feature in the advertisement; and
- facilitate evaluating the health of the optical module based at least in part on the data corresponding to the VDM feature.

3. The system of claim 2, wherein the circuitry is further configured to modify the PM software to interpret the data corresponding to the VDM feature as presented in the advertisement based at least in part on a data format provided in the configuration update, wherein the data format identifies at least one of:
- an identifier of the VDM feature;
- a data type of the VDM feature;
- a least significant bit (LSB) scale of the VDM feature; or
- a unit of measurement of the VDM feature.

4. The system of claim 2, wherein the circuitry is further configured to modify the optical module to include the data corresponding to the VDM feature in the advertisement.

5. The system of claim 1, wherein the circuitry is further configured to:
- enable the PM software to communicate with a command-line interface (CLI) of a computing device; and
- report the data corresponding to the VDM feature to an administrator via the CLI.

6. The system of claim 1, wherein:
- the PM software comprises a version of the PM software whose initial configuration lacked support for the VDM feature; and
- the circuitry is further configured to achieve support for the VDM feature via the configuration update instead of installing another version of the PM software that supports the VDM feature.

7. The system of claim 1, wherein the circuitry is further configured to:
- delete a different VDM feature from the PM software; and
- refrain from reporting data corresponding to the different VDM feature via the PM software.

8. The system of claim 7, wherein the circuitry is further configured to modify the optical module to avoid inclusion of data corresponding to the different VDM feature in one or more advertisements.

9. The system of claim 8, wherein:
- the circuitry comprises a processing device; and
- the circuitry is further configured to:
  - reduce a compute load of the PM software based at least in part on the modification to the optical module; or
  - reduce a transmission load on a bus that communicatively couples the optical module to the circuitry based at least in part on the modification to the optical module.

10. The system of claim 8, wherein the different VDM feature comprises at least one of:
- an effective signal-to-noise ratio (ESNR);
- an optical signal-to-noise ratio (OSNR);
- a chromatic dispersion value;
- a differential group delay;
- a polarization dependent loss (PDL) value;
- a carrier frequency offset;

a power level of a receiver signal;

a power level of a transmitter signal; or a modulator bias value.

11. The system of claim 8, wherein the VDM feature comprises at least one of:

a signal-to-noise (SNR) margin;

a Q factor; or a Q-factor margin.

12. The system of claim 1, wherein the circuitry is further configured to receive the configuration update from at least one of:

a computing device operated by an administrator who provides user input that forms at least a portion of the configuration update; or a remote device that provides the configuration update as an event.

13. A method comprising:

identifying, by circuitry, a configuration update for performance monitoring (PM) software that monitors health of an optical module compatible with one or more versatile dynamic monitoring (VDM) features of the PM software;

activating, by the circuitry, a VDM feature of the PM software based at least in part on the configuration update; and reporting, by the circuitry, data corresponding to the VDM feature via the PM software.

14. The method of claim 13, further comprising:

receiving, by the circuitry, at least one advertisement from the optical module;

identifying, by the circuitry, the data corresponding to the VDM feature in the advertisement; and facilitating, by the circuitry, an evaluation of the health of the optical module based at least in part on the data corresponding to the VDM feature.

15. The method of claim 14, wherein installing the configuration update comprises modifying the PM software to interpret the data corresponding to the VDM feature as presented in the advertisement based at least in part on a data format provided in the configuration update, wherein the data format identifies at least one of:

an identifier of the VDM feature;

a data type of the VDM feature;

a least significant bit (LSB) scale of the VDM feature; or a unit of measurement of the VDM feature.

16. The method of claim 14, wherein installing the configuration update comprises causing the circuitry to modify the optical module to include the data corresponding to the VDM feature in the advertisement.

17. The method of claim 13, further comprising:

enabling, by the circuitry, the PM software to communicate with a command-line interface of a computing device; and reporting, by the circuitry, the data corresponding to the VDM feature to an administrator via the command-line interface.

18. The method of claim 13, wherein the PM software comprises a version of the PM software whose initial configuration lacked support for the VDM feature; and further comprising achieving, by the circuitry, support for the VDM feature via the configuration update instead of installing another version of the PM software that supports the VDM feature.

19. The method of claim 13, further comprising:

removing, by the circuitry, a different VDM feature from the PM software; and refraining from reporting data corresponding to the different VDM feature via the PM software.

20. A non-transitory computer-readable medium comprising one or more computer-executable instructions that, when executed by at least one processing device, cause the processing device to:

identify a configuration update for performance monitoring (PM) software that monitors health of an optical module compatible with one or more versatile dynamic monitoring (VDM) features of the PM software;

activate a VDM feature of the PM software based at least in part on the configuration update; and report data corresponding to the VDM feature via the PM software.

* * * * *